United States Patent
Claeson et al.

(10) Patent No.: US 6,488,445 B1
(45) Date of Patent: Dec. 3, 2002

(54) METHOD AND DEVICE FOR OIL SPILL RESPONSE OPERATION

(76) Inventors: Claes Magnus Claeson; Peter Lofgren, both of Nya Varvet 97, SE-426 71 Vastra Frolunda (SE)

( * ) Notice: Subject to any disclaimer, the term of this patent is extended or adjusted under 35 U.S.C. 154(b) by 0 days.

(21) Appl. No.: 09/857,017

(22) PCT Filed: Dec. 3, 1999

(86) PCT No.: PCT/SE99/02264
§ 371 (c)(1),
(2), (4) Date: May 31, 2001

(87) PCT Pub. No.: WO00/34589
PCT Pub. Date: Jun. 15, 2000

(30) Foreign Application Priority Data

Dec. 4, 1998 (SE) .............................. 9804217

(51) Int. Cl.[7] .......................... E02B 15/06; B63H 25/06

(52) U.S. Cl. ....................... 405/63; 210/242.1; 114/246

(58) Field of Search .............................. 405/52, 60, 63, 405/65; 210/241–242.4; 114/242, 246

(56) References Cited

U.S. PATENT DOCUMENTS

| | | | |
|---|---|---|---|
| 1,397,891 A | 11/1921 | Jones | 210/154 |
| 4,146,477 A | * 3/1979 | Challener | 210/143 |
| 4,511,285 A | * 4/1985 | Eriksson | 405/66 |
| 4,661,013 A | * 4/1987 | Jenkins | 405/15 |
| 5,727,902 A | 3/1998 | Brown | 405/63 |

* cited by examiner

Primary Examiner—Thomas B. Will
Assistant Examiner—Tara L. Mayo
(74) Attorney, Agent, or Firm—Eli D. Eilbott

(57) ABSTRACT

A method and a device for performing the methods, for response to a spill on water whereby one end of an oil boom is towed from the shore of a watercourse with flowing water, at an angle to the water current, to a suitable position in the watercourse, using a waterborne current rudder. The current rudder is secured to one end of a line, the other end of the line is secured to an upstream point ashore, allowing the current rudder to move out into the stream and to maintain one end of the oil boom in a suitable position in the watercourse, while the other end of the oil boom is secured to a downstream point ashore, where an oil recovery device is positioned. The current rudder is fitted with a balance rudder operated by a line or a remote control from shore, allowing the current rudder and the oil boom end attached thereto, to be recovered to shore when so required.

10 Claims, 6 Drawing Sheets

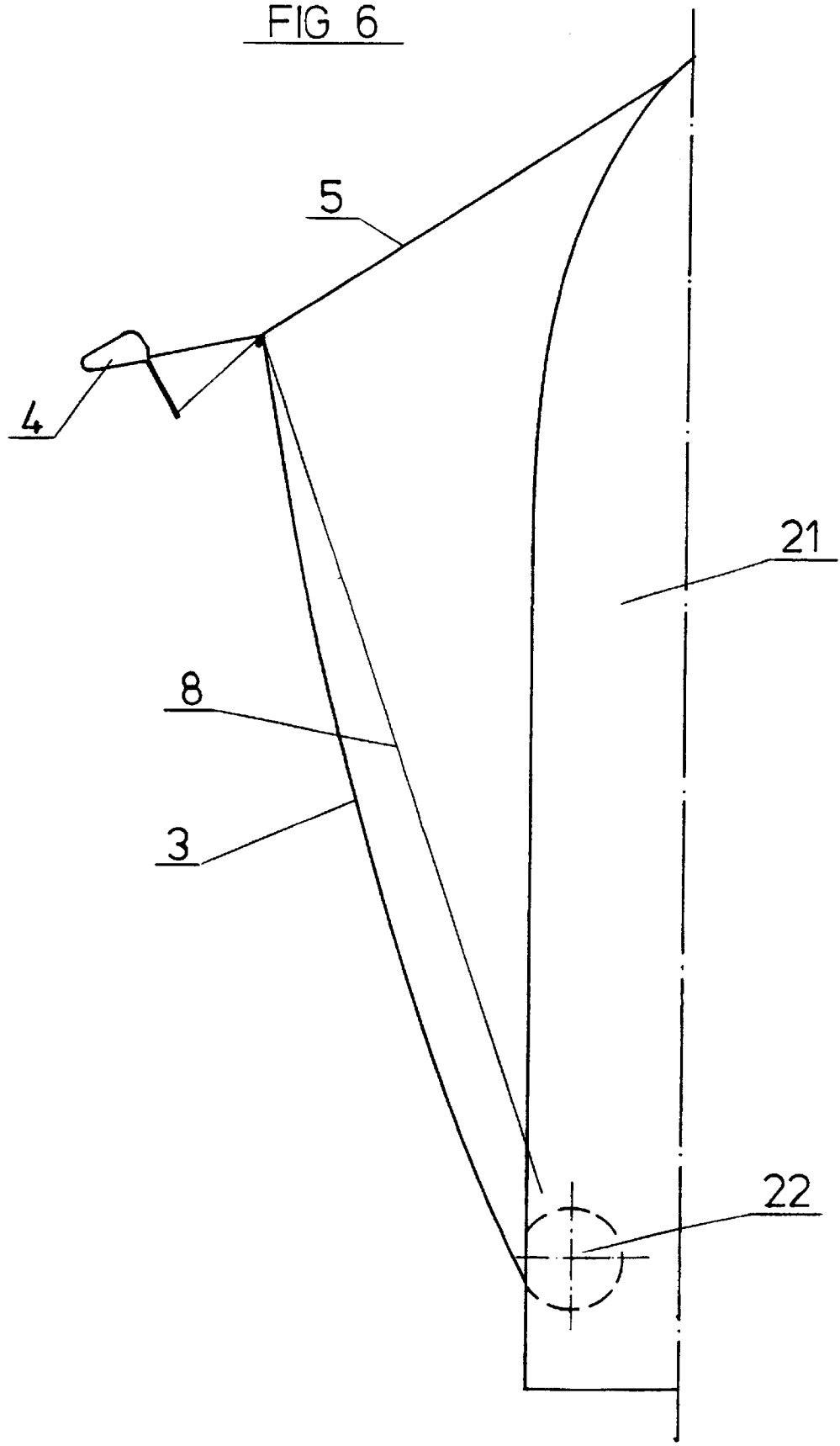

METHOD AND DEVICE FOR OIL SPILL RESPONSE OPERATION

BACKGROUND OF INVENTION

The subject invention concerns a method and a device for performing the method, for response to a spill on water whereby e.g. one end of an oil boom is towed from the shore of a watercourse with flowing water e.g. a river, at an angle to the water current, to a suitable position in the watercourse, using a waterborne current rudder. The current rudder is secured to one end of a line, the other end of the line is secured ashore, allowing the current rudder to move out into the stream and to maintain one end of the oil boom in a suitable position in the watercourse, while the other end of the oil boom is secured to shore further downstream, where an oil recovery device is positioned.

The current rudder is fitted with a balance rudder operated by a line or a remote control from shore, allowing the current rudder and the oil boom end attached thereto, to be recovered to shore when so required.

The method can also be used to protect the shoreline from being impacted by oil, by securing the upstream end of the oil boom to shore and using the current rudder to tow the downstream end of the oil boom out from the shore.

The method can also be applied from a vessel making speed through the water. The current rudder, secured to one end of a line, the other end of the line being secured to the fore part of the vessel, tows out one end of an oil boom from the side of the ship, the other end of the oil boom being secured to the vessel's oil recovery device or to an oil recovery device being towed by the vessel. Current rudders with oil booms can be operated from both sides of the vessel at the same time, to increase the oil recovery swath and to counteract the steering imbalance of the vessel resulting from drag created by deployment of a current rudder on one side of the vessel only.

Earlier known methods for oil spill response operations in flowing waters entail either mooring the upstream end of the oil boom to the bottom, by anchor or fixed buoy or other fixed mooring device, or deploying the oil boom across the entire watercourse by mooring it to both shores to the disadvantage of any vessel traffic. Both these alternatives require a suitable boat for towing out the oil boom in the watercourse. Earlier known methods for oil spill recovery in open water require either two vessels towing the oil boom and possibly a third vessel for the actual oil recovery, or one vessel with a jib or mast rigged horizontally from the vessel side, alternatively from both sides, to which the end of the oil boom or oil booms are secured. The jibs or masts are subjected to great forces, and are often difficult to handle in heavy seas.

BRIEF SUMMARY OF THE INVENTION

The object of the subject invention is to eliminate the major disadvantages with earlier known methods for oil spill response operations in flowing waters and to facilitate deployment and recovery of oil booms from shore by, in accordance with the patent claims, using a waterborne and remotely, e.g. by line, manoeuvred current rudder to tow one end of an oil boom to a suitable position in the watercourse and at any time recover the same to terminate operations or to let vessels pass through the area of operation. The current rudder and the required mooring and control lines can be transported, handled and deployed by two persons without the aid of any vessel. When deployed and positioned the operation of the current rudder and oil boom requires one person on the shore from which the device was deployed.

BRIEF DESCRIPTION OF THE INVENTION

In the following, the invention is described in closer detail with reference to the accompanying drawings.

FIG. 6 is a schematical view from above showing oil recovery from a vessel.

DETAILED DESCRIPTION OF THE INVENTION

Figure 1:
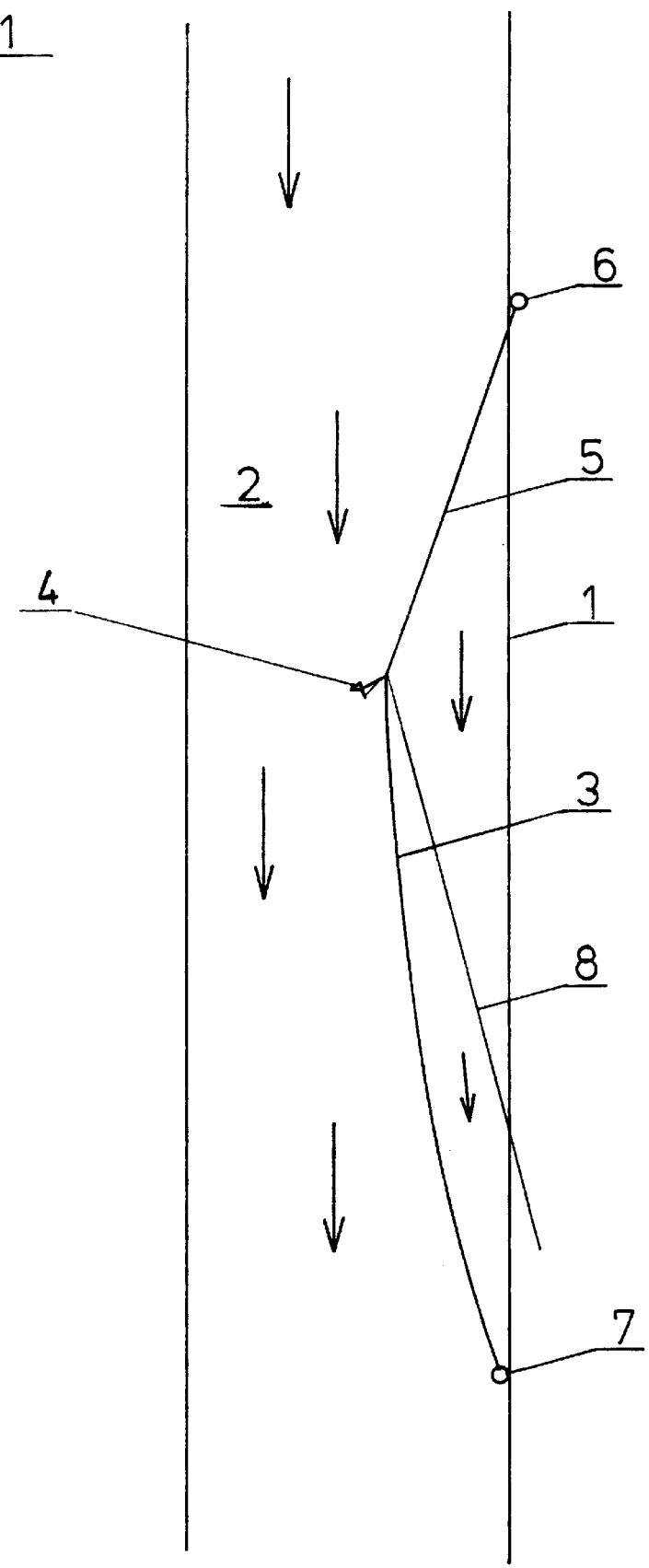
FIG. 1 is a schematical view from above showing oil recovery along a shore of a watercourse.
Figure 2:
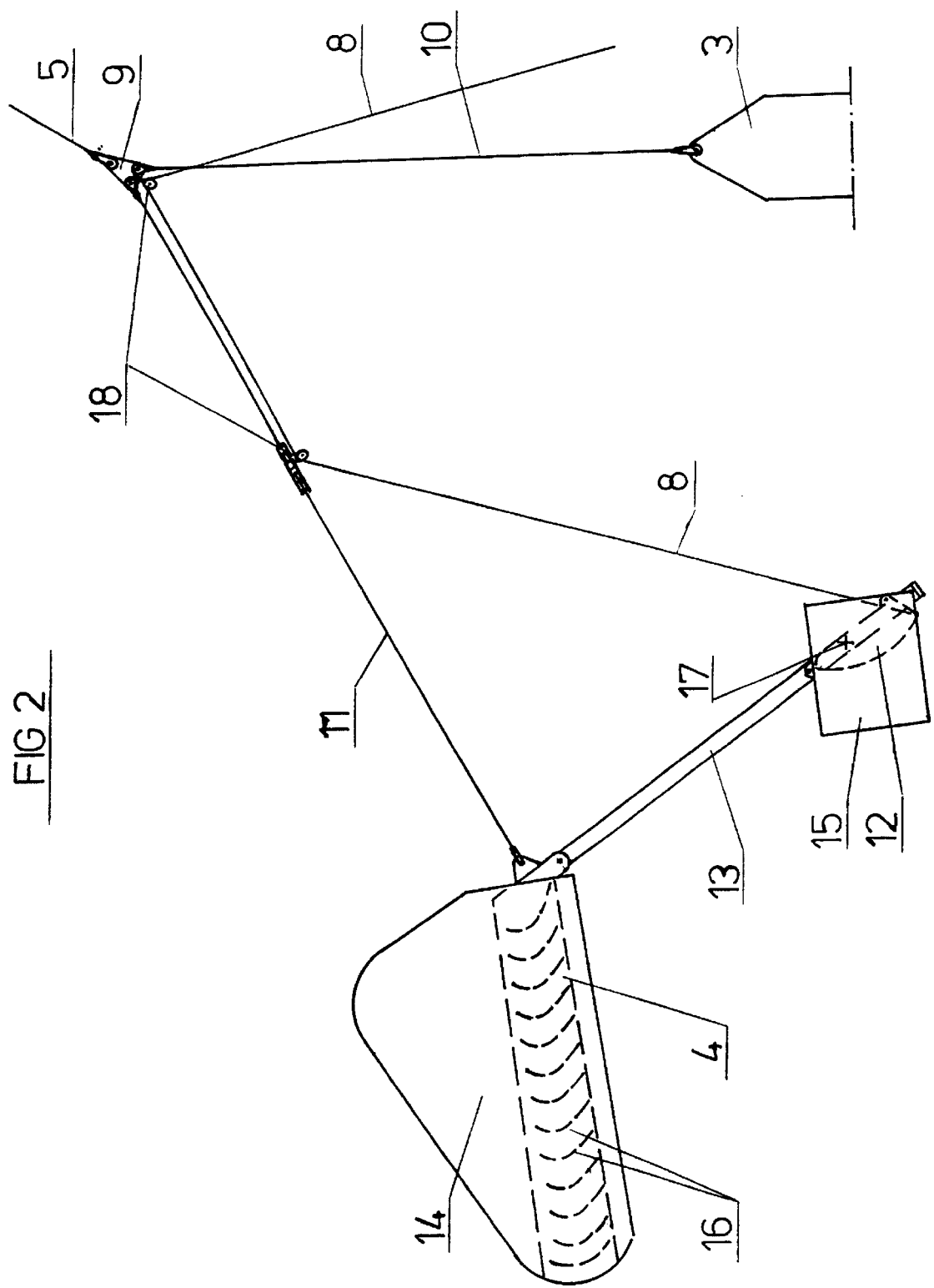
FIG. 2 is a view from above showing in greater detail the connection of the current rudder and the oil boom to the mooring line.

FIG. 1 shows the shoreline 1 and to the left thereof the flowing water 2. One end of the oil boom 3 is connected to the connector ring 9 (FIG. 2) held by the mooring line 5 which is made fast to the shore at 6. The current rudder 4 is connected by a bridle 11 (FIG. 2) to the connector ring 9 (FIG. 2). The other end of the oil boom is made fast downstream along the shoreline at 7 where an oil recovery device is positioned. A control line 8 for manoeuvring the balance rudder runs from the same through the blocks 18 (FIG. 2) to the position 7 of the operator on shore.

FIG. 2 shows the connection of the current rudder 4 and the oil boom 3 to the connector ring 9 at the end of the mooring line 5. The oil boom is connected to the connector ring 9 by a strop 10. The ends of the bridle 11 is connected to the upper and lower frame members 19 (FIG. 3) respectively, of the current rudder. The vertical, wing-shaped balance rudder 12 swings around bearing pins 17 on the rudder arms 13 that are mounted on the upper and lower frame members respectively. A floatation body 14 that keeps the current rudder 4 afloat is mounted on the upper frame member. The bulbous nose of the floatation body reduces the formation of bow waves. Above the balance rudder that during operation maintains the current rudder at an optimal angle to the current, the outer end of the upper rudder arm is fitted with an horizontal stabiliser wing 15 that maintains the current rudder vertical in the water. The outward directional horizontal force of the current rudder results from the current or movement induced flow of water through the array of vertical wing shaped plates 16 mounted between the upper and lower frame members. The multiplicity, wing shape and attitude of the plates 16 allow for the largest possible volume of water to be deflected when flowing through the current rudder, thus creating the force required to drive the current rudder, despite its small size and low weight, outward from the shore in an arc with the boom end in tow, and holding up the latter in an angle to the current. The balance rudder can be swung around by means of the control line 8 to change the attitude of the current rudder in relation to the water current to near parallel, whereby the current rudder looses the outward directional force and, aided by the current or movement induced water force acting on the balance rudder, returns to shore. Any vessel traffic can thereby pass the deployment site unobstructed.

Figure 3:
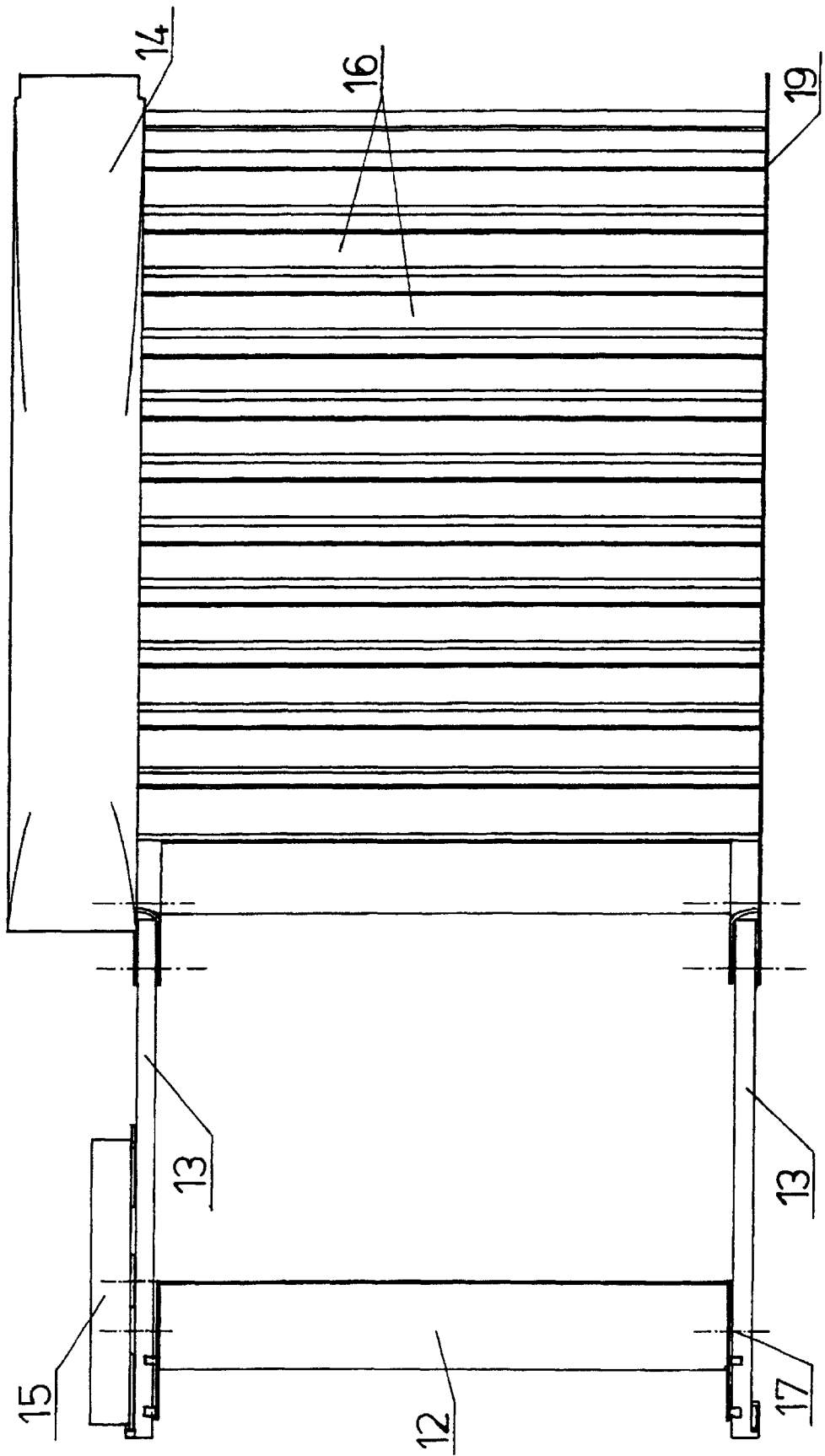
FIG. 3 is a vertical view of the current rudder.

FIG. 3 shows a vertical view of the current rudder and the wing shaped plates 16 fitted to the upper and lower frame members 19 respectively, of the current rudder 4. FIG. 3 also shows the balance rudder 12 mounted on bearing pins 17 on the rudder arms 13. The detachable floatation body 14 and the detachable stabiliser wing 15 are mounted on the upper frame member and the upper rudder arm respectively. For deployment of the current rudder from the left shore of e.g. the river instead of the right shore as shown in FIG. 1, the current rudder is turned up-side-down and the floatation body and the stabiliser wing are mounted on the opposite frame member and rudder arm respectively.

Figure 4:
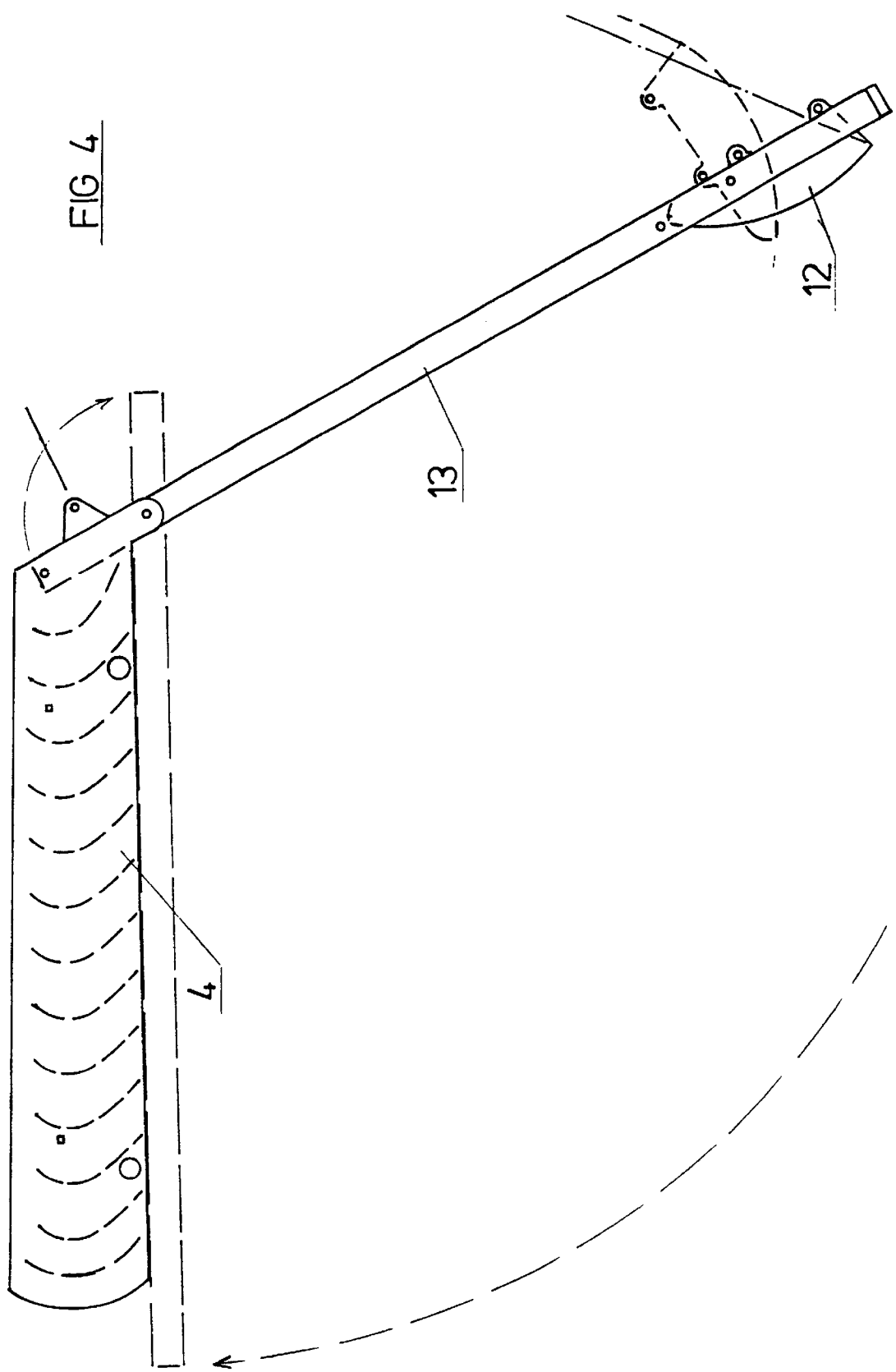
FIG. 4 is a horizontal view of the current rudder and its balance rudder.

FIG. 4 shows how the rudder arms 13 with the balance rudder 12 can be swung in towards the current rudder 4 to rest parallel to the same, to reduce storage and transportation volume.

Figure 5:
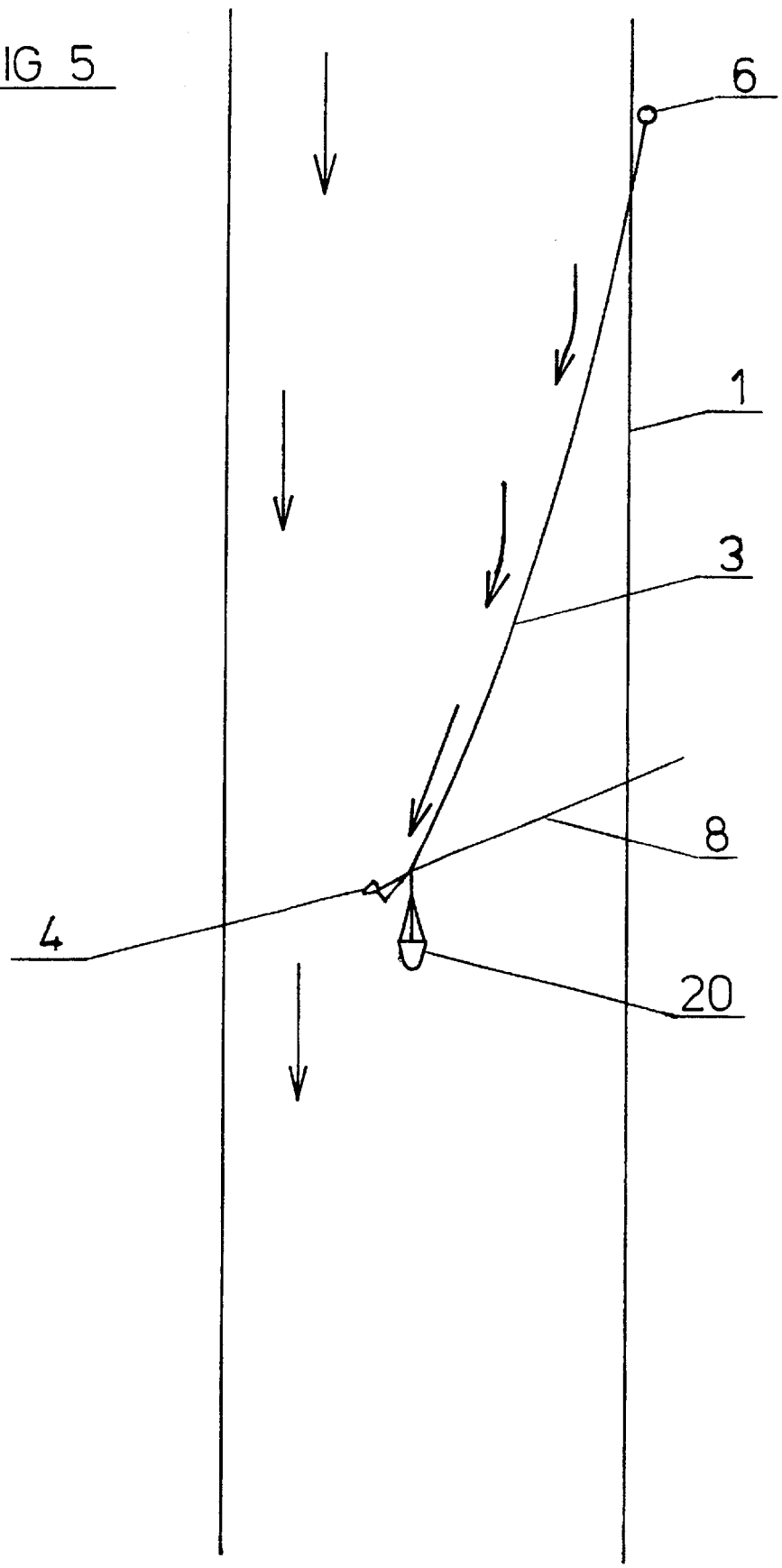
FIG. 5 is a schematical view from above showing oil being deflected from the shore.

FIG. 5 shows the shore protection mode of operating the current rudder, where the oil is deflected from the shore 1. The oil boom 3 is then made fast to the shore point 6 and the current rudder 4 tows out the downstream end of the oil boom from the shore. To optimise the curvature of the oil boom a drifting anchor 20 may be fitted to the downstream end of the oil boom. The balance rudder control line is marked 8.

FIG. 6 shows the vessel mode of operation where the mooring line 5 of the current rudder 4 is made fast to the fore part of the vessel 21 and the downstream end of the oil boom 3 is connected to the oil recovery device 22 of the vessel. The balance rudder control line is marked 8.

The invention has been described in connection with removal of oil floating on water but the device might likewise be used for removal of other substances such as chemical substances or objects floating on or near the surface of water. The invention is not limited to the examples in the aforegoing description and drawings but could be varied as to its detail components within the scope of the appended claims without departing from the fundamental inventive idea of the invention. For example, the invention encompasses other designs of the wing shaped plates, e.g. wing profile or attitude, other designs of the floatation body, other designs of the stabiliser wing, other designs of the balance rudder and the methods for manoeuvring of the same, e.g. by remotely operated motor or magnets.

What is claimed is:

1. A method for spill response operation in flowing waters using oil booms to deflect substances floating on the water to an oil recovery device characterized by:
   one end of an oil boom being connected to a waterborne current rudder to which one end of a mooring line is connected;
   the other end of the mooring line being secured to a first, relative to the water flow, fixed point, enabling the current rudder and the end of the oil boom to traverse the water flow outwards from the shore; and
   the other end of the oil boom being secured to a second fixed point ashore which is in the approximate direction of the water flow relative to the first fixed point and at a distance from the latter exceeding the total length of the oil boom, so that the entire length of the oil boom is positioned between the current rudder and the second fixed point at an angle relative to the direction of the water flow.

2. The method of claim 1 characterized by the current rudder comprising:
   a floatation body that in the water maintains afloat an array of separate, vertical wing shaped plates held in place by an upper and a lower frame member;
   said wing shaped plates are arranged in a manner so that the water flowing between the plates creates a large sideways directional force driving the current rudder outwards transversally across the flow of the watercourse;
   said current rudder is maintained in a near perpendicular attitude relative to the direction of the water flow, and is on one side fitted with a vertical wing shaped balance rudder mounted between two rudder arms which are fitted to the upper and lower frame members;
   said balance rudder swings around bearing pins but is held in the normal working position by the water flow, against stop lugs;
   said balance rudder is maneuvered by a control line that when pulled will turn the balance rudder so that the direction of the water flow over the surface of the balance rudder will reverse; and
   said reversal of the direction of the water flow creates a force that turns the free end of the current rudder downstream whereby the water flow, the balance rudder and the maneuver force in the control line will drive the current rudder towards shore and the curvature of the oil boom will follow the direction of the water flow instead of being positioned at an angle to said water flow direction.

3. The method of claim 1 or 2 characterized by the spill response operation being conducted in a river where the fixed points are placed along the shoreline and the function of the balance rudder when turned is to cause the current rudder to temporarily bring the oil boom towards shore to allow vessels to pass through the area of operation.

4. The method of claim 1 or 2 characterized by the oil boom, in a shore protection made, being reoriented so that one of said boom is secured to the upstream fixed point and the other end of the oil boom being connected to the current rudder downstream to deflect spills from the shoreline and to prevent said spills from affecting the shore.

5. The method of claim 1 or 2 characterized by spill response operation in open waters conducted by a vessel, whereby;
   the mooring point of the mooring line is fixed to the fore part of the vessel, on one or both sides of the vessel;
   the current rudder together with the forward end of the oil boom move outward from the vessel side as the vessel makes speed through the water; and
   the stern end of the oil boom is connected to an oil recovery device at the aft part of the vessel or to an oil recovery vessel following the first vessel.

6. A device for performing the method of claim 2, comprising:
   the current rudder comprising two horizontal frame members between which a number of separate, vertical and angled, wing shaped plates are mounted;
   a detachable floatation body to hold the current rudder afloat mounted on the upper frame member;
   a vertical balance rudder mounted on two bearing pins fixed to two horizontal arms angularly mounted to the frame members;
   the ends of the frame members facing the balance rudder having fittings for ends of a bridle;
   said bridle connects to a connecting ring at an end of the mooring line; and
   the control line to turn the balance rudder is connected to the balance rudder that under the force of the water flow rests against stop lugs.

7. A device for performing the method of claim 2, comprising:

the current rudder comprising two horizontal frame members between which a number of separate, vertical and angled, wing shaped plates are mounted;

a detachable floatation body to hold the current rudder afloat mounted on the upper frame member;

a vertical balance rudder mounted on two bearing pins fixed to two horizontal arms angularly mounted to the frame members;

the ends of the frame members facing the balance rudder having fittings for ends of a bridle;

said bridle connects to a connecting ring at the end of the mooring line;

the control line to turn the balance rudder is connected to the balance rudder that under the force of the water flow rests against stop lugs; and the detachable floatation body comprises a bulbous nose in the part protruding from the frame member.

8. A device for performing the method of claim 2, comprising:

the current rudder comprising two horizontal frame members between which a number of separate, vertical and angled, wing shaped plates are mounted;

a detachable floatation body to hold the current rudder afloat mounted on the upper frame member;

a vertical balance rudder mounted on two bearing pins fixed to two horizontal arms angularly mounted to the frame members;

the ends of the frame members facing the balance rudder having fittings for ends of a bridle;

said bridle connects to a connecting ring at the end of the mooring line;

the control line to turn the balance rudder is connected to the balance rudder that under the force of the water flow rests against stop lugs; and the upper arm of the balance rudder comprises a detachable horizontal stabilizer wing.

9. A device for performing the method of claim 2, comprising:

the current rudder comprising two horizontal frame members between which a number of separate, vertical and angled, wing shaped plates are mounted;

a detachable floatation body to hold the current rudder afloat mounted on the upper frame member;

a vertical balance rudder mounted on two bearing pins fixed to two horizontal arms angularly mounted to the frame members;

the ends of the frame members facing the balance rudder having fittings for ends of a bridle;

said bridle connects to a connecting ring at the end of the mooring line;

the control line to turn the balance rudder is connected to the balance rudder that under the force of the water flow rests against stop lugs; and the detachable floatation body is also attachable to the lower frame member.

10. A device for performing the method of claim 2, comprising:

the current rudder comprising two horizontal frame members between which a number of separate, vertical and angled, wing shaped plates are mounted;

a detachable floatation body to hold the current rudder afloat mounted on the upper frame member;

a vertical balance rudder mounted on two bearing pins fixed to two horizontal arms angularly mounted to the frame members;

the ends of the frame members facing the balance rudder having fittings for ends of a bridle;

bridle connects to a connecting ring at the end of the mooring line;

the control line to turn the balance rudder is connected to the balance rudder that under the force of the water flow rests against stop lugs;

the upper arm of the balance rudder comprises a detachable horizontal stabilizer wing; and the detachable stabilizer wing is also attachable to the lower arm.

* * * * *